| United States Patent [19] | [11] Patent Number: 4,908,340 |
|---|---|
| Frechette et al. | [45] Date of Patent: Mar. 13, 1990 |

[54] NON-OXIDE SINTERED CERAMIC FIBERS

[75] Inventors: Francis J. Frechette, Tonawanda; Wolfgang D. G. Boecker, Lewiston; Carl H. McMurtry, Youngstown; Martin R. Kasprzyk, Ransomville, all of N.Y.

[73] Assignee: The Standard Oil Company, Cleveland, Ohio

[21] Appl. No.: 74,080

[22] Filed: Jul. 16, 1987

[51] Int. Cl.$^4$ .................. C04B 35/02; C04B 35/80
[52] U.S. Cl. .................. 501/95; 264/DIG. 19; 501/88; 501/96; 501/97
[58] Field of Search .......... 501/95, 96, 88, 97; 264/DIG. 19; 428/614

[56] References Cited

U.S. PATENT DOCUMENTS

| 3,529,044 | 9/1970 | Santangelo | 264/29 |
|---|---|---|---|
| 3,760,049 | 9/1973 | Borer et al. | 264/57 |
| 3,808,015 | 4/1974 | Seufert | 501/95 |
| 3,846,527 | 11/1974 | Winter et al. | 264/63 |
| 3,909,278 | 9/1975 | Johnson | 501/95 |
| 3,992,498 | 11/1976 | Morton et al. | 264/63 |
| 4,010,233 | 3/1977 | Winter et al. | 264/63 |
| 4,071,594 | 1/1978 | Pearson et al. | 264/63 |
| 4,117,057 | 9/1978 | Yajima et al. | 264/63 |
| 4,123,286 | 10/1978 | Coppola et al. | 501/90 |
| 4,158,687 | 6/1979 | Yajima et al. | 264/60 |
| 4,250,131 | 2/1981 | Sobel et al. | 264/56 |
| 4,314,852 | 2/1982 | Brennan et al. | 501/95 |
| 4,342,712 | 8/1982 | Yajima et al. | 264/63 |
| 4,399,232 | 8/1983 | Yajima et al. | 501/38 |
| 4,515,742 | 5/1985 | Yajima et al. | 264/DIG. 19 |
| 4,559,191 | 12/1985 | Arons | 264/60 |

Primary Examiner—William R. Dixon, Jr.
Assistant Examiner—Anthony J. Green
Attorney, Agent, or Firm—Teresan W. Gilbert; Joseph G. Curatolo; Larry W. Evans

[57] ABSTRACT

A high temperature, preferably polycrystalline, ceramic fiber having a selectable diameter of between 1 and 200 microns. The fiber is stable in an inert atmosphere at a temperature above about 1700° C. and is often stable even in air at a temperature above 1500° C. The fiber comprises a sintered ceramic powder having a maximum particle size less than the diameter of the fiber and an average particle size less than 0.2 times the diameter of the fiber. The ceramic powder is also stable in an inert atmosphere at a temperature above about 1700° C. At least 90% of the ceramic is selected from borides, nitrides, carbides, and silicides. The fiber is characterized by a smooth surface and is preferably out of round.

The invention further comprises a textilable sinterable filament, comprising a flexible polymer matrix containing high temperature sinterable ceramic powder particles. The ceramic powder particles are selected from ceramic borides, nitrides, carbides, and silicides. The diameter of the filament is from 2 to 300 microns. The invention also comprises the method for making textilable filament by fiberizing a mixture of a polymer and a sinterable non-oxide fiber and the method wherein the high temperature ceramic fiber is prepared by sintering the textilable sinterable filament as previously described. The invention also includes composites containing such filaments.

30 Claims, 3 Drawing Sheets

NON-OXIDE SINTERED CERAMIC FIBERS

BACKGROUND OF THE INVENTION (1) Field of the Invention

This invention relates to ceramic fibers useful for insulation and reinforcement purposes and more particularly relates to nonoxide fibers suitable for these uses.

(2) History of the Prior Art

Ceramic fibers have been used for an extended period of time in the prior art for various purposes including insulation and, to some extent, reinforcement. An example of such a fiber that might be considered ceramic is the naturally occurring asbestos fiber which has now fallen into disfavor because of health problems. In addition, for long periods of time, alumina, silica, and alumina silicate fibers have been manufactured for various uses, including reinforcement, insulation and as fillers. Such oxygen containing fibers do not, however, have the properties desired for certain high performance applications. In particular, such oxide type fibers often do not have coefficients of thermal expansion which are as close as desirable to the matrix material which is being reinforced and usually do not have heat resistance as high as desirable for very high temperature performance applications. In addition, corrosion resistance of oxide fibers is often not as good as desirable in certain environments such as molten metals. Furthermore, many oxides do not have an elastic modulus as high as desirable for stiffening in reinforcement applications. Examples of such oxide type fibers may be found in U.S. Pat. Nos. 4,071,594; 4,250,131; 3,808,015 and 3,992,498.

Such oxide fibers in the prior art have generally been manufactured by melt spinning or blowing or by drawing of a precursor material, sometimes with included oxide powders, which is then often converted to an alumina material. Such methods have not generally been found applicable, to this point, to very high temperature nonoxide ceramics. Such very high temperature nonoxide ceramics tend not to melt at manageable temperatures and in fact tend to decompose or sublime prior to melting. Attempts have also been made to make nonoxide ceramic fibers by means of precursors, e.g. as taught in U.S. Pat. Nos. 3,529,044; 4,117,057 and 4,158,687. Such fibers have not, however, been as good as desirable since such precursors tend to leave large amounts of substances, e.g. oxygen, in the fibers which are often detrimental to their properties often reducing strength, temperature resistance and chemical resistance.

Attempts have, nevertheless, been made to utilize nonoxide ceramic materials for high temperature insulation or for high performance reinforcement. An example of such a reinforcing material is silicon carbide whiskers which have been considered by some to fall within the general description of a fiber. Such whiskers are, in fact, believed to be single elongated crystals which are difficult to manufacture, even by batch methods, and are very costly. In addition, the diameters and lengths of such whiskers which can be manufactured are exceedingly restricted. Other attempts to manufacture nonoxide ceramic fibers have not usually been highly successful since materials are generally incorporated into the fiber which do not have high performance characteristics.

There is therefore a need for a high performance nonoxide ceramic fiber of high purity which can be manufactured, desirably continuously, to various specifications including cross sectional shape and length. It would be desirable to have such a fiber which is stable, both chemically and physically, in an inert atmosphere at temperatures of 1700° C. and higher and stable even in air at temperatures of 1500° C. and higher.

Furthermore, ceramic fibers manufactured in the prior art are typically difficult to handle, especially when it is desired to utilize such fibers for formation of textile fabrics. It is therefore desirable to have a method and a product which will permit woven products to be developed which contain nonoxide ceramic fibers.

A particularly interesting prior art patent is U.S. Pat. No. 4,559,191 which describes forming a fiber by hydrostatically pressing a ceramic powder as a core in a hollow polymer fiber. The disadvantages of such a process are clear, i.e. difficulty in getting the powder into the core, hydrostatic processing requirement and expense. In addition, the fiber would not be expected to have a high cross sectional aspect ratio to obtain improved bending resistance in the direction of the long cross sectional axis. Additionally, the fiber of this Pat. No. 4,559,191 would not be expected to have a smooth surface, which is desirable to reduce defects. This is true because it is generally known that isopressed sintered articles have rougher surfaces than drawn or extruded sintered articles. "Smooth" as used herein therefore means smoother than the surface of an isopressed article made of the same material and shape. Such "smooth" articles, when large enough, generally are characterized by a surface which does not scatter light and thus reflect light brightly, i.e. the surface shows gloss and usually will reflect images. The "rough" surface of a sintered isopressed article, on the other hand, tends to have a dull finish resulting from light scatter. "Smooth" is, however, not intended to exclude cross sections which are not circular or eliptical. Surfaces which have a relatively uniform cross section along their longitudinal axis can reflect light, uniformly from their surfaces, e.g. star-shaped cross sections.

BRIEF DESCRIPTION OF THE INVENTION

In accordance with the invention, there is therefore provided a high temperature, preferably polycrystalline, ceramic fiber having a selectable diameter of between 1 and 200 microns. The fiber is stable in an inert atmosphere at a temperature above about 1700° C. and is often stable even in air at a temperature above 1500° C. The fiber comprises a sintered ceramic powder having a maximum particle size less than the diameter of the fiber and an average particle size less than 0.2 times the diameter of the fiber. The ceramic powder is also stable in an inert atmosphere at a temperature above about 1700° C. At least 90% of the ceramic is selected from borides, nitrides, carbides, and silicides. The fiber is characterized by a smooth surface, as opposed to the rough surface which usually results from isopressing. The fiber preferably has a high cross sectional aspect ratio and is out of round for increased stiffening in reinforcement. The fiber also desirably has an indented surface for better bonding.

The fiber and its preparation is particularly unexpected since prior to the present invention it could not have been predicted that an article having such characteristics and such a small cross-sectional dimension could have been sintered from a nonoxide ceramic powder.

The invention further comprises a textilable sinterable filament, i.e. machine weavable, spinnable and knittable, comprising a flexible polymer matrix containing high temperature sinterable ceramic powder particles. The average particle size of the particles is less than 0.15 times the diameter of the sinterable filament and is preferably submicron. The ceramic powder particles are selected from ceramic borides, nitrides, carbides, and silicides. The diameter of the filament is from 2 to 300 microns. The invention also comprises the method wherein the high temperature ceramic fiber is prepared by sintering the textilable sinterable filament as previously described and includes composites containing such filaments.

DETAILED DESCRIPTION OF THE INVENTION

Figure 1:
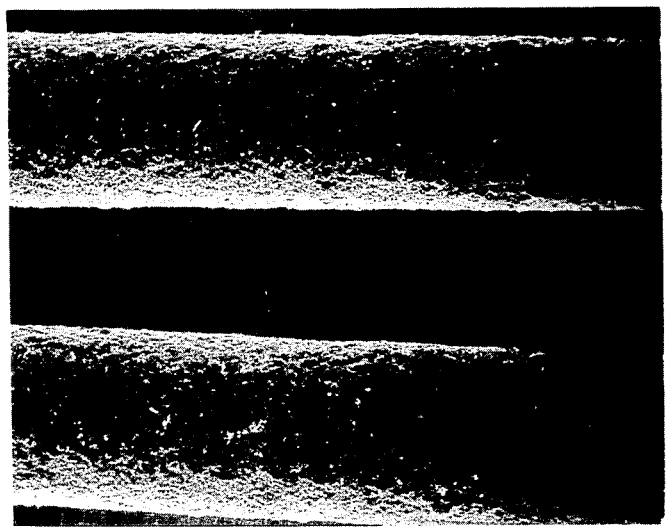
FIGS. 1–6 show photomicrographs of fibers prepared in accordance with the present invention.

As previously discussed, it has now been unexpectedly found that nonoxide ceramic fibers having a diameter of between 1 and 200 microns can be sintered from uncoated nonoxide ceramic powders. The fiber usually comprises a boride, carbide, nitride or silicide of a different element, i.e. other than silicon when the compound is a silicide, and boron when the compound is a boride selected from aluminum, boron, chromium, hafnium, molybdenum, niobium, silicon, tantalum, titanium, tungsten, vanadium and zirconium.

Suitable ceramic powders, for example, may be the powders selected from the ceramics of the group $B_4C$, HfC, NbC, SiC, TaC, VC, WC, ZrC, $CrB_2$, $HfB_2$, $NbB_2$, $TaB_2$, $TiB_2$, VB, WB, $ZrB_2$, AlN, HfN, NbN, $Si_3N_4$, TaN, TiN, VN, ZrN, $Mo_5Si_3$, $MoSi_2$ and ZrSi and mixtures thereof.

Particularly desirable ceramics for use in accordance with the present invention are titanium diboride ($TiB_2$), silicon carbide (SiC), and boron carbide ($B_4C$). These materials have been found to be sinterable in accordance with the requirements of the present invention with the addition of minimal amounts of sintering aids and furthermore all of these materials are stable at temperatures in excess of 2200° C. The fibers in accordance with the invention can therefore consist essentially of non-oxide ceramic materials, i.e. almost always greater than 90% and preferably greater than 95% non-oxides. The performance of the sintered fibers of the invention is therefore not significantly affected by oxide phases, as was the case with prior art non-oxide ceramic fibers which were prepared by other means, e.g. by use of precursors.

The sintering methods are similar to those described in U.S. Pat. No. 4,123,286 except for the presence of the flexible polymer matrix. The polymer matrix may comprise any suitable polymer including phenolics, polyolefins, polyhalogenated olefins including polyvinylchloride, or any other polymer which is free from atoms which will tend to decompose the ceramic material at elevated temperatures. The resin must be capable of itself decomposing at sintering temperature or below to form volatile products or in some cases to form a small percentage of residual carbon which may aid the sintering process. Specific desirable polyolefins are polyethylene and polypropylene. Sintering aids which are included in the composition forming the textilable fibers are such sintering aids as are known to those skilled in the art. Such sintering aids, exclusive of carbon, which is usually at least partly provided by the polymer and other organic compounds in a system and sometimes also at least partly provided by submicron carbon powder, are those sintering aids for the particular ceramic known to those skilled in the art. When the ceramic powder is silicon carbide, a particularly desirable sintering aid is boron carbide which is usually present in an amount of from 0.2 to 1 percent by weight of the silicon carbide powder.

The average particle size of the particles is less than 0.15 times the diameter of the textilable sinterable filament and is preferably submicron. When the sinterable filament is in fact sintered, the diameter of the filament usually becomes less, i.e. a volume shrinkage of 40 to 60%, in which case the starting average particle size of the powder is usually less than 0.2 times the diameter of the finished sintered filament.

The sinterable filament and the composition forming it desirably contain from about 75 to about 95 weight percent of ceramic powders and from about 5 to about 25 weight percent organic compounds including the polymers. The organic portion of the composition forming the sinterable filament includes not only the polymers but any other organic materials which are desirable including lubricants such as oleic acid, petroleum jelly, surfactants such as dioctylphthalate, oils such as corn oil, dimethylformamide which acts as a polymer solvent and tetraethylhexal- titanate which acts as a dispersion aid. The composition as above described with respect to the filaments is exclusive of diluents utilized in the system to form the sinterable filament. Such diluents can include a number of organic compounds such as ethanol, acetone, oils, and volatile hydrocarbons such as toluene and hexane.

The sinterable filaments may be formed by melt spinning or suspension spinning as subsequently described.

In melt spinning, the silicon carbide, sintering aids, and organic compounds including polymers, plasticizers, and dispersants are melt blended. The blended components are then desirably pelletized and the pellets are melt spun by extrusion. The resulting continuous sinterable filaments are collected.

In the case of suspension spinning, the silicon carbide powder and sintering aids are milled or mixed with the organic constituents with sufficient diluent to form a suspension. The resulting suspension is then spun and dried. The resulting fiber is then sintered. Sinterable filaments may also be made in random sizes by blowing or by centrifugal spinning. In this case, the components are blended together in a manner similar to suspension spinning except that the resulting blend is utilized in an apparatus for blowing filaments or in a centrifugal spinner.

The sinterable filaments of the present invention are generally textilable and may be fabricated into woven or felted products or may be utilized to form thicker yarns. The filaments may either be sintered before they are fabricated or may be sintered subsequent to fabrication of other products. The sintering temperature for the ceramic powder usually ranges between 1700° and 3000° C. depending upon the system and when the ceramic is silicon carbide the sintering temperature more specifically usually ranges between 2000° and about 2300° C. The sintering time is usually from 0.2 to 90 minutes and usually from 0.5 to 20 minutes. The sintered product may optionally be coated with graphite or another lubricant to assist in handling. The resulting sintered filaments, when conditions are properly controlled, can have tensile strengths in excess of 100,000 psi (689 MPa) and preferably in excess of 175,000 psi (1,200 MPa). Desirably, the fibers may have a modulus of elasticity in excess of 25 million psi (172 GPa) and preferably in excess of 50 million psi (345 GPa). For example, in comparison, the modulus of elasticity of silicon carbide has been reported to be about 55 million psi (318 GPa), of titanium diboride about 76 million psi (524 GPa), and of boron carbide about 65 million psi (448 GPa). The finished fiber diameter is desirably between 10 and 150 microns. The fibers of the present invention may be used for reinforcing in other structural materials, such as metals, ceramics, glasses, glass ceramics and polymers. The fiber usually comprises a boride, carbide, nitride or silicide of a different element selected from aluminum, boron, chromium, hafnium, molybdenum, niobium, silicon, tantalum, titanium, tungsten, vanadium and zirconium.

Such fibers often have high cross sectional average aspect ratios, e.g. at least 1.3:1 (largest cross sectional dimension divided by smallest cross sectional dimension through the center of the large dimension) and the fiber usually has a roundness of greater than 1.15 and preferably greater than 1.5. Such fibers have a greater resistance to bending in the direction of the longer cross sectional dimension.

"Roundness" as used herein means the area of the fiber divided into the calculated area of the fiber if it were assumed that the fiber were a perfect circle. The calculated area is determined based upon the measured perimeter of the fiber. The roundness can be readily determined by the formula $P^2/4\pi A$ where P is the measured perimeter and A is the measured cross sectional area. The fiber surface is usually indented which permits better surface bonding within a matrix. A greater roundness number, indicates increased deviation from a circle.

The filaments of the present invention are particularly desirable since a particular nonoxide ceramic can be selected to obtain a desirable coefficient of thermal expansion to match a material being reinforced. In addition, numerous such nonoxide ceramics have good corrosion resistance in contact with molten metals which is not obtainable with oxide type ceramic materials. The fibers have excellent heat resistance when an appropriate ceramic material is selected which may be in excess of 1700° C. in an inert atmosphere up to as high as almost 4000° C. In addition, even in air the fiber may be stable at temperatures above 1500° C. up to as high as 1700° C. when the ceramic is appropriately selected. Silicon carbide fibers made in accordance with the present invention, for example, are stable in air at temperatures as high as 1600° C. and are stable in inert atmospheres at temperatures as high as 2300° C. Boron carbide filaments manufactured in accordance with the present invention are similarly stable in an inert atmosphere at temperatures as high as 2250° C. and titanium diboride fibers made in accordance with the present invention are stable at temperatures as high as 2500° C. A sintered zirconium carbide filament in accordance with the present invention, can be stable in an inert atmosphere at temperatures above 3400° C. "Inert atmosphere" as used herein means an atmosphere with which the ceramic does not react. Such atmospheres are intended to include an atmosphere of an inert gas or vacuum. "Stable" as used herein means chemically and physically stable, i.e. the material will not significantly decompose, melt, soften or sublime.

The following examples serve to illustrate and not limit the present invention. Unless otherwise indicated, parts and percentages are by weight.

EXAMPLE I

Melt Spinning

Formulation
  Alpha SiC powder having a specific surface area of about 10 m²/g, having an average particle size of less than 1.0 micron and containing 0.5% B₄C: 86.15 g,
  Phenolic Resin, (MW~800): 5.82 g,
  Polyethylene, (MW 200,000-250,000): 7.01 g,
  Polyethylene, (MW 1,500,000-2,000,000): 6.01 g,
  Oleic Acid: 9.58 g.

The mixing was carried out in a Brabender Plastograph blender whose mixing bowl was preheated to 150° C. Approximately one-half the powder and all the organics were added to the mixer with blades running at 20 rpm until fluxing has occurred. The remaining powder was added in small increments. When addition was complete, the mixing speed was increased to 60 rpm and maintained for approximately 30 minutes. The composition was removed, granulated and charged to a fiberizing apparatus equipped with an orifice 0.50 mm diameter×2.54 mm long and heated to 165° C. The material was forced through the orifice by applying pressure in the form of weights on a piston.

The 0.50 mm extrudate was attenuated to approximately 0.20 to 0.10 mm by wrapping around a rotating spool. The collected filaments were removed from the spool, dusted with graphite powder and hang fired in a furnace up to 2300° C. in a nitrogen atmosphere. Tensile strengths measured on such filaments were as high as 104,000 psi (717 MPa).

Figure 2:
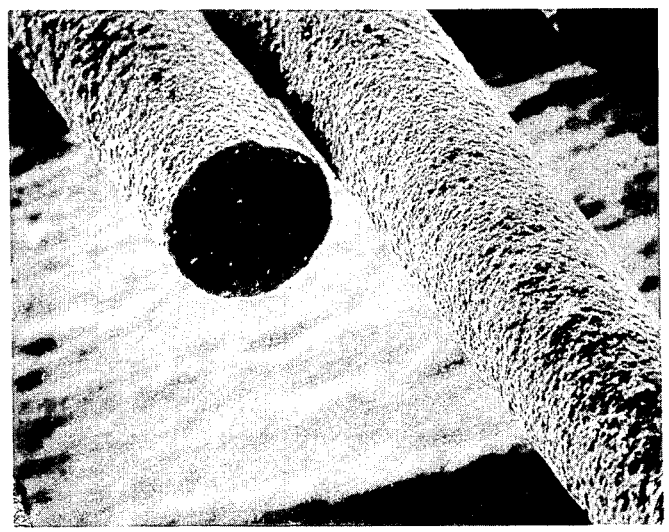

The resulting fibers were photographed at 200× on an SEM. Representative photographs are shown in FIGS. 1 and 2. Analysis on a computer image analyzer showed an average roundness of 1.17. At the 200× magnification some minor roughness can be seen which would not be visible without magnification. The smooth appearance without magnification is apparent from the uniform highlights shown along the longitudinal axis even at high magnification.

EXAMPLE II

Melt Spinning

Formulation
  SiC Powder as in Example I: 72.99 g,
  Petrolatum: 11.55 g,
  Polyethylene, (MW 200,000-250,000): 5.50 g,
  Dioctylphthalate: 4.00 g,
  Polyethylene, (MW 1,500,000-2,000,000): 5.00 g,
  Phenolic Resin, (MW~800): 3.25 g,
  Tetraethylhexyltitanate: 0.50 g.

Approximately 9 Kg of the above composition was prepared using a 1½ gallon steam-heated Sigma blade mixer. After mixing was completed and the composition granulated, it was fiberized using a laboratory melt spinning unit. In this case, the granules were remelted in a small extruder and delivered to a gear pump which metered the material to a spinnerette plate containing 20 holes having a diameter of 0.30 mm each. Godet rolls provided further attenuation to 0.20 to 0.10 mm.

Collected SiC filaments were coated with graphite dust and hang fired in a furnace up to 2150° C. in argon. Tensile strengths measured on such filaments were as high as 90,000 psi (620 MPa).

EXAMPLE III

Suspension Spinning—Dry

Formulation
SiC Powder as in Example I: 80.0 g,
Polyvinylbutyral, (MW 225,000): 9.0 g,
Dioctylphthalate: 8.0 g,
Corn Oil: 2.0 g,
Polyethylene Glycol (MW 400): 3.0 g,
Dimethylformamide: 8.0 g,
Resole—Phenolic Resin, (MW~300): 2.0 g.

Mixing was carried out in a Brabender Plastograph blender at room temperature. A small amount of trichloroethylene and ethanol was added to adjust the consistency of the composition to that of putty. The mixture was extruded using a Melt Index Apparatus equipped with an orifice 0.18 mm in diameter. Weights were applied to the piston for extrusion. The extrudate was collected on absorbent paper and allowed to dry. After drying, the filaments measured 0.1 mm in diameter. The filaments were anchored to a green SiC plate and sintered in argon up to 2150° C. Tensile strengths of such filaments were found to be as high as 192,000 psi (1,324 MPa).

EXAMPLE IV

Suspension Spinning—Dry

Formulation
SiC Powder as in Example I: 50.0 g,
Polyethylene Oxide, (MW 4,000,000): 10.0 g,
Acetone: 17.0 g,
Ethanol: 17.0 g,
Phenolic Resin, (MW~800): 2.3 g.

Mixing was carried out in a Brabender Plastograph blender at room temperature with sufficient distilled water to obtain the consistency of putty. The mixture was fiberized in a small extrusion apparatus and collected on a rotating spool. The filaments were sintered at 2150° C. for 15 minutes.

Figure 3:
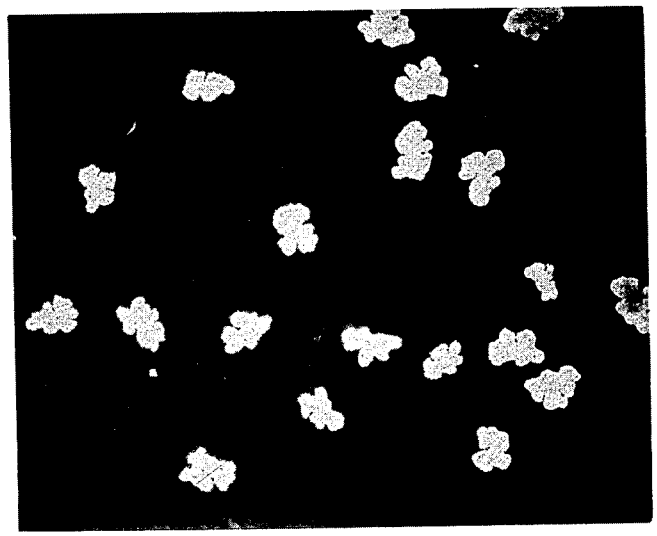
Figure 4:
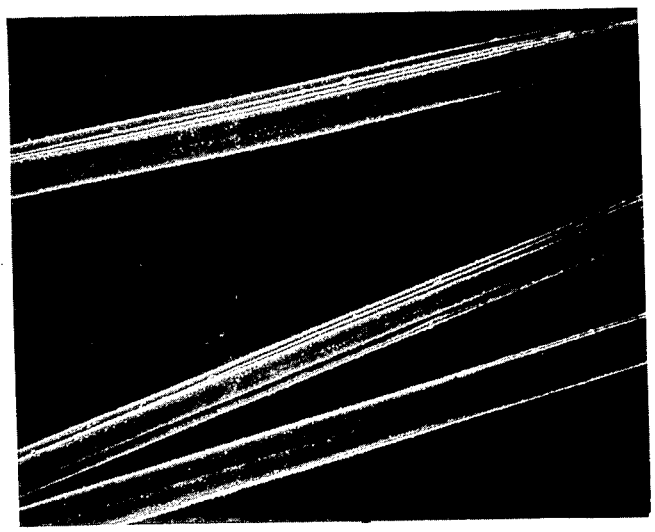

The resulting fibers were photographed on an SEM at 200×. Representative photographs are shown in FIGS. 3 and 4. The average roundness, as determined by a computerized image analyzer is 2.08. A comparison of the photograph along the longitudinal axis with a photograph of the fiber cross section clearly shows a characteristic consistent smoothness in the longitudinal direction despite the very unusual cross section.

EXAMPLE V

Blown Filaments

Formulation
SiC Powder as in Example I: 100.0 g,
Resole Phenolic, (MW~300): 5.0 g,
Corn Oil: 10 drops,
Dimethylformamide: 20 drops,
Ethanol/Acetone 50/50 vol: to make thin slurry.

The above ingredients were mixed in a beaker to disperse and coat the SiC particles with phenolic resin. The solvents were evaporated. The resulting mixture was ball milled in a jar for 16 hours. The following was added to the jar mill:
Toluene: 70.0 g,
Polyethylene Glycol (MW 400): 10.0 g,
Dioctylphthalate: 4.0 g,
Corn Oil: 1.0 g,
Dimethylformamide: 25.0 g.

Ball milling was continued for one hour. Then 10.0 g polyvinylbutyral (MW 225,000) and 10.0 g ethanol was added and milling continued for an additional three hours. The slip that was produced was strained through an 80 mesh screen and deaired in vacuum until rapid bubbling ceased. The slip was then ready for fiberization. A syringe was filled with slip and discharged into an air jet. Air impingement angles could be varied from 0° to 90° and the droplets could still be broken up into very fine fibers. Sizes varied but some as small as 2 μm were measured.

EXAMPLE VI

Preparation of AlN Fibers

The procedure of Example I was essentially followed except that the formulation was:
AlN Powder having a specific surface area of about 7 m²/g, having an average particle size of about 1.5 micron and containing 1% $Y_2O_3$: 83.0 g,
Petrolatum: 14.0 g,
Polyethylene (MW 200,000–250,000): 5.5 g,
Polyethylene (MW 1,500,000–2,000,000): 2.0 g,
Corn Oil: 1.5 g.

A Brabender Plastograph blender was used for mixing the above components for 20 minutes at 160° C. The processed fibers were placed on a graphite plate and sintered in nitrogen at 1850° C. for 1½ hours to form high temperature sintered aluminum nitride fibers.

EXAMPLE VII

Preparation of $B_4C$ Fibers

The procedure of Example I was followed except that the formulation was:
$B_4C$ Powder having a specific surface area of about 8 m²/g and having an average particle size of about 1.5 micron: 50.0 g,
Polyethylene Oxide (4,000,000 MW): 10.0 g,
Acetone: 16.0 g,
Methanol: 16.0 g,
Phenolic Resin (MW~800): 5.0 g,
Water: 1.0 g.

The fiberizing apparatus comprised a spinnerette having 20 holes each 0.2 mm in diameter. The mixed formulation was forced through the spinnerette at about 70 psi (0.5 MPa). The filaments were collected at about 30 feet (9.14 meters) per minute.

The resulting extruded fibers were hang fired in a $B_4C$ coated graphite crucible in argon. The temperature was raised to 2150° C. and held for 6 minutes to form high temperature boron carbide fibers.

Figure 5:
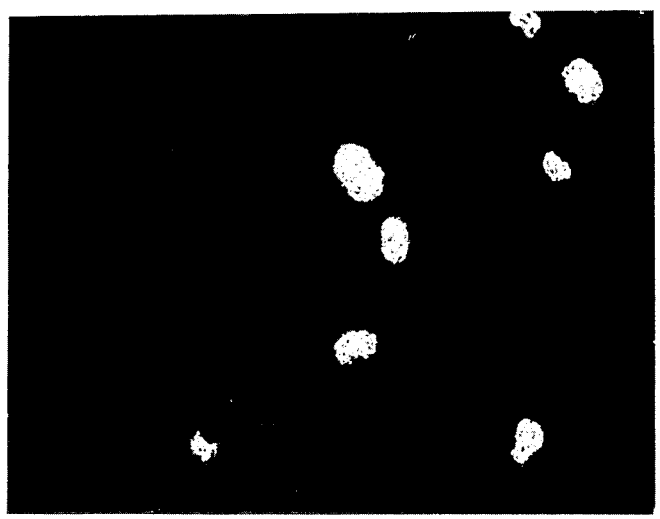

A 200× photograph of the cross section of characteristic fibers made substantially in accordance with this invention is shown in FIG. 5.

EXAMPLE VIII

Preparation of $TiB_2$ Fibers

The procedure of Example V was followed except that the formulation was:
$TiB_2$ Powder having a specific surface area of about 8 m²/g and having an average particle size of about 1.5 micron: 50.0 g,
Polyethylene Oxide (MW 600,000): 10.9 g, Acetone: 15.0 g,
Ethyl Alcohol: 15.0 g,
Phenolic Resin (MW ~800): 2.5 g,
Water: 5.3 g.

Random samples of the resulting extruded filaments were measured and found to have diameters of between 18.4 and 28.3 microns. The filaments were hang fired in a B$_4$C coated crucible in argon for about 15 minutes at about 2150° C. to form high temperature titanium diboride fibers.

The sintered titanium diboride product remained fiberous and had a silver-gray color.

Figure 6:
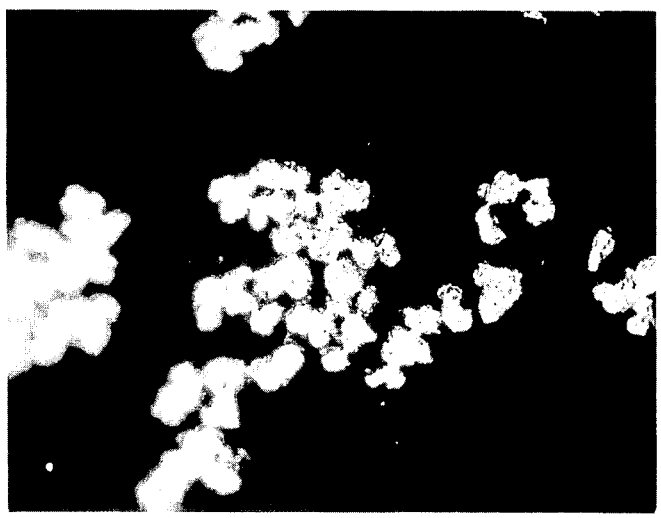

A 500×cross sectional photograph of characteristic fibers made substantially in accordance with this example is shown in FIG. 6.

EXAMPLE IX

Fibers from Beta SiC

The procedure of Example VI was followed except that the formulation was:

Beta SiC Powder having a specific surface area of between 15.1 and 18.7 m$^2$/g and having an average particle size between 0.25 and 0.29 micron, HF & HNO$_3$ Treated and Washed: 75.27 g,
Low Density Polyethylene (MW 200,000–250,000): 5.22 g,
Polyethylene (MW 1,500,000–2,000,000): 4.75 g,
Tetraethylhexyltitanate: 0.48 g,
Petrolatum: 10.92 g,
Dioctylphthalate: 3.80 g,
Phenolic Resin (MW ~800): 3.09 g.

Upon fiberizing, the fibers were attenuated to about 0.1 mm (100 microns) in diameter. The filaments were hang fired in a graphite crucible coated with a slurry containing 9 parts SiC and 1 part B$_4$C. Sintering was accomplished in an argon atmosphere. For sintering, the temperature was raised to 1900° C. and held for 5 minutes. The resulting product was a sintered silicon carbide filament.

EXAMPLE X

Aluminum—SiC Filament Composites

Approximately 60.0 grams of green SiC filaments prepared per Example II were cut into 6 mm lengths. The cut filaments were randomly loaded into a 75×150 mm compression mold and compacted with sufficient pressure to produce a block about 6 mm thick. The block was sintered in Argon at 2150° C. for 60 minutes. The calculated pore volume on the resulting filament compact was approximately 70%. The sintered filament compact was pressure infiltrated with molten aluminum to produce an aluminum block reinforced with SiC filaments.

EXAMPLE XI

Al$_2$O$_{3+5}$% SiC Polycrystalline Fiber Composite 4.0 g SiC polycrystalline fiber (about 100 μm in diameter) were placed in a mortar and pestal and lightly chopped to achieve a fiber length of between about 1.5 to 3.0 mm.

95.0 g Al$_2$O$_3$ powder +0.45 g (0.5%) MgO were placed in a beaker. The 4 g of chopped fibers were added to the powder and mixed by rolling for ½ hour to distribute the fiber in the Al$_2$O$_3$.

The mixed powder and fiber were then poured into a 63.5 mm diameter graphite mold that was coated with BN and lined with graphite paper. The powder was leveled and a top plunger inserted and cold pressed to about 1500 psi (10 MPa).

The mold was then placed in a hot press furnace and hot pressed to about 1500° C. at a rate of 1200° C./hour with maximum pressure of about 1800 psi (12 MPa) on the part and held at temperature for ½ hour.

A density of 3.89 g/cc 98.5% of theoretical density was found. Micro cracks could be seen in the matrix.

EXAMPLE XII

SiC+20% SiC Polycrystalline Fibers (Pressureless Sintered) Composite

Alpha SiC Powder as in Example I: 56.0 g,
Resole Phenolic Resin (MW 300): 1.3 g,
Oleic Acid: 1.3 g,
Polyethylene Glycol (MW 20,000): 1.3 g.

The above chemicals were placed in a 500 ml ball mill jar with mixed alcohols (ethanol with 5% methanol) and milled together for 2 hours.

12.0 g of SiC sintered polycrystalline fiber having a diameter of about 100 μm were placed in a mortar and pestal and lightly chopped to achieve lengths of between about 1.5 and 3.0 mm.

The milled mix was poured into a glass dish and allowed to settle. The clear alcohol was decanted and the remaining slurry placed on a hot plate to evaporate more solvent and thicken. The 12.0 g of crushed SiC fibers were slowly added to the slurry while stirring. The blend was then allowed to dry.

The dry powder was placed into a 63.5 mm square steel mold and cold pressed. The cold pressed plate was then isopressed to 17,000 psi (117 MPa) and sintered to 2150° C. in argon.

A density of 2.73 g/cc, equal to 85.3% of theoretical density was found. The matrix showed some cracking and some fibers appeared not tightly bound to the matrix.

EXAMPLE XIII

SiC+20% TiB$_2$ Polycrystalline Fibers

Alpha SiC Powder as in Example 1: 50.0 g,
Resole Phenolic Resin (MW ~300): 1.3 g,
Oleic Acid: 1.3 g,
Polyethylene Glycol (MW 20,000): 1.3 g.

The above chemicals were placed in a 500 ml ball mill jar with mixed alcohols and milled together for 2 hours.

15.0 g of TiB$_2$ sintered polycrystalline fiber as prepared in Example VIII were placed in a mortar and pestal and lightly chopped to achieve lengths of between ⅛" and 1/16" (1.5 mm and 3.0 mm).

The milled mix was poured into a glass dish and allowed to settle. The clear alcohol was decanted and the remaining slurry placed on a hot plate to evaporate more solvent and thicken. The 15.0 g of chopped TiB$_2$ fibers were slowly added to the slurry while stirring. The blend was then allowed to dry.

The dry powder was placed into a 63.5 mm square steel mold and cold pressed at 12,000 psi (83 MPa). The cold pressed plate was then isopressed to 17,000 psi (117 MPa) and pressureless sintered to 2150° C. in argon.

The resulting composite showed a density of 2.91 g/cc, equal to 86.1% of theoretical density. Microstructure observation revealed little evidence of matrix cracking.

What is claimed is:

1. A high temperature polycrystalline ceramic fiber consisting essentially of non-oxide ceramic materials, said fiber having a diameter of between 1 and 200 microns, said fiber being stable in an inert atmosphere at a temperature above about 1700° C., said fiber comprised of a sintered ceramic powder having a maximum particle size less than the diameter of the fiber, said ceramic powder also being stable in an inert atmosphere at a temperature above about 1700° C., at least 90% of said ceramic material in said fiber consisting of non-oxide borides, nitrides, carbides and silicides of aluminum, boron, chromium, hafnium, molybdenum, niobium, silicon, tantalum, titanium, tungsten, vanadium and zirconium, said fiber having a smooth surface, said fiber having a roundness of greater than 1.15.

2. The fiber of claim 1 wherein the fiber has a cross sectional average aspect ratio of at least 1.3:1.

3. The fiber of claim 1 wherein the fiber has a roundness of greater than 1.5.

4. The ceramic fiber of claim 1 wherein the ceramic powder is selected from ceramic powders of the group consisting of $B_4C$, $HfC$, $NbC$, $SiC$, $TaC$, $VC$, $WC$, $ZrC$, $CrB_2$, $HfB_2$, $NbB_2$, $TaB_2$, $TiB_2$, $VB$, $WB$, $ZrB_2$, $AlN$, $HfN$, $NbN$, $Si_3N_4$, $TaN$, $TiN$, $VN$, $ZrN$, $Mo_5Si_3$, $MoSi_2$ and $ZrSi$ and mixtures thereof.

5. The ceramic fiber of claim 1 wherein the ceramic powder is titanium diboride, silicon carbide, boron carbide or mixtures thereof.

6. The ceramic fiber of claim 2 wherein the ceramic powder is titanium diboride, silicon carbide, boron carbide or mixtures thereof.

7. The ceramic fiber of claim 1 wherein the ceramic powder is silicon carbide powder.

8. The ceramic fiber of claim 6 wherein the ceramic powder is silicon carbide powder.

9. The high temperature ceramic fiber of claim 1 wherein the ceramic powder is stable in an inert atmosphere at a temperature above 2000° C.

10. The ceramic fiber of claim 1 wherein the fiber has a tensile strength in excess of about 100,000 psi (689 MPa).

11. The ceramic fiber of claim 1 wherein the ceramic fiber has a tensile strength in excess of about 175,000 psi (1,200 MPa).

12. The ceramic fiber of claim 1 wherein the fiber diameter is between 10 and 150 microns.

13. The ceramic fiber of claim 7 wherein the fiber diameter is between 10 and 150 microns.

14. The fiber of claim 1 wherein the fiber has a modulus of elasticity in excess of 25 million psi (172 GPa).

15. The fiber of claim 1 wherein the fiber has a modulus of elasticity in excess of 50 million psi (345 GPa).

16. The fiber of claim 7 wherein the fiber has a modulus of elasticity in excess of 25 million psi (172 GPa).

17. The fiber of claim 7 wherein the fiber has a modulus of elasticity in excess of 50 million psi (345 GPa).

18. A structural material reinforced with the fiber of claim 1 wherein the structural material is a metal, ceramic, glass, glass ceramic or polymer.

19. A ceramic product reinforced with the fiber of claim 1.

20. A ceramic product reinforced with the fiber of claim 2.

21. A structural material reinforced with the fiber of claim 5 wherein the structural material is a metal, ceramic, glass, glass ceramic or polymer.

22. A ceramic product reinforced with the fiber of claim 5.

23. A structural material reinforced with the fiber of claim 7 wherein the structural material is a metal, ceramic, glass, glass ceramic or polymer.

24. A ceramic product reinforced with the fiber of claim 7.

25. A ceramic product reinforced with the fiber of claim 14.

26. A ceramic product reinforced with the fiber of claim 15.

27. A ceramic product reinforced with the fiber of claim 17.

28. The fiber of claim 1 wherein the ceramic powder has an average particle size less than 1 micron.

29. The ceramic fiber of claim 2 wherein the powder has an average particle size of less than 1 micron.

30. The ceramic fiber of claim 7 wherein the silicon carbide powder has an average particle size of less than 1 micron.

* * * * *